United States Patent
Liu et al.

(10) Patent No.: US 10,603,755 B2
(45) Date of Patent: Mar. 31, 2020

(54) LUBRICATION DEVICE FOR WHEEL MACHINING

(71) Applicant: CITIC Dicastal CO., LTD., Qinhuangdao, Hebei (CN)

(72) Inventors: Huiying Liu, Qinhuangdao (CN); Bowen Xue, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 16/117,439

(22) Filed: Aug. 30, 2018

(65) Prior Publication Data
US 2019/0076974 A1   Mar. 14, 2019

(30) Foreign Application Priority Data

Sep. 14, 2017   (CN) .......................... 2017 1 0826738

(51) Int. Cl.
*B23Q 11/10*  (2006.01)
*B23Q 11/00*  (2006.01)

(52) U.S. Cl.
CPC ............ *B23Q 11/10* (2013.01); *B23Q 11/005* (2013.01); *B23Q 11/1046* (2013.01)

(58) Field of Classification Search
CPC ................................ B23Q 11/10; B23Q 11/12
See application file for complete search history.

(56) References Cited

U.S. PATENT DOCUMENTS 5,265,505 A  * 11/1993 Frechette ............. B23Q 1/0018
                                                                29/39
2018/0015582 A1* 1/2018 Mohr ..................... B23Q 11/10

FOREIGN PATENT DOCUMENTS

| CN | 201357344 Y | 12/2009 |
|----|-------------|---------|
| CN | 101811269 B | 5/2012  |
| CN | 104289967 A | 1/2015  |
| CN | 205870128 U | 1/2017  |

OTHER PUBLICATIONS

Supplementary European Search Report in European application No. 18194134.5, dated Jan. 3, 2019, 42 pgs.

* cited by examiner

*Primary Examiner* — Alan Snyder
(74) *Attorney, Agent, or Firm* — COOPER LEGAL GROUP, LLC

(57) ABSTRACT

Disclosed is a lubricating device for wheel machining, which is composed of an air compressor, a safety valve, an oil drain valve, an oil tank, an oil filling port, an oil quantity regulating valve, an oil mist pressure regulating valve and the like. The air compressor is fixed on a frame, and an oil mist pressure regulating knob is connected outside the regulating valve; the other path is connected to an air pressure regulating valve, and an air pressure regulating knob is connected outside the regulating valve; an oil mist pressure gauge interface is arranged between the oil mist pressure regulating valve and an oil mist generator, and an oil mist pressure gauge is connected outside the interface; an air pressure gauge interface is arranged between the air pressure regulating valve and an air separator, and a compressed air pressure gauge is connected outside the interface.

2 Claims, 2 Drawing Sheets

LUBRICATION DEVICE FOR WHEEL MACHINING

CROSS-REFERENCE TO RELATED APPLICATION

The present application claims benefit of Chinese Patent Application No. 201710826738.7, filed on Sep. 14, 2017, the contents of which are hereby incorporated by reference in its entirety.

BACKGROUND

At present, when an aluminum wheel is machined, the lubrication method uses a cutting fluid lubrication, that is, a cutting fluid with a proper concentration is prepared in advance, a fluid supply device sprays a large amount of the cutting fluid to a machined part for lubricating, and then the waste fluid is recovered. The traditional cutting fluid lubrication method has many disadvantages: the use cost of the cutting fluid is very high; during the use process, the cutting fluid flows away, bursts, drops, leaks, and is prone to producing peculiar smell and odor, which not only pollutes the environment, but also causes certain damage to the health of operators. Therefore, for the aluminum wheel machining process, a novel and environment-friendly lubrication method must be sought to replace the traditional cutting fluid lubrication so as to reduce the production cost and improve the production environment. The micro-lubrication cutting technique is to mix a small amount of pollution-free oil mist into compressed gas to replace the large amount of cutting fluid to cool and lubricate a cutting point. The high-speed oil mist spray increases the permeability of the lubricant, and improves the cooling and lubrication effect, thereby improving the surface machining quality of a workpiece. At present, such technique is widely used in the fields of gears, crankshafts, mold processing, etc., but has not been involved in the aluminum wheel machining industry. Based on the current situation, the present patent innovatively introduces the micro-lubrication technique into the aluminum wheel manufacturing industry and invents a micro-lubrication device for wheel machining.

SUMMARY

The present disclosure relates to the technical field of hub machining, and specifically, relates to a lubrication device for wheel machining.

The object of the present disclosure is to provide a wheel machining lubrication device, which can be used for an aluminum wheel machining process and completely replaces the traditional cutting fluid lubrication method.

In order to achieve the above object, the technical solution of the present disclosure is:

A wheel machining lubrication device includes adjustable feet 1, a frame 2, a power interface 3, a power switch 4, an air compressor 5, a safety valve 6, an oil drain valve 7, an oil tank 8, an oil filling port 9, an oil quantity regulating valve 10, an oil mist pressure regulating valve 11, an oil mist pressure gauge interface 12, an air pressure regulating valve 13, an air pressure gauge interface 14, an oil mist generator 15, an air separator 16, an oil mist pressure gauge 17, an oil mist pressure regulating knob 18, a compressed air pressure gauge 19, an air pressure regulating knob 20, oil mist output interfaces A1-A6 and compressed air output interfaces B1-B5. The air compressor 5 is fixed on the frame 2, the output end thereof is divided into two paths, one path is connected to the oil mist pressure regulating valve 11, and the oil mist pressure regulating knob 18 is connected outside the regulating valve; the other path is connected to the air pressure regulating valve 13, and the air pressure regulating knob 20 is connected outside the regulating valve; the oil mist pressure gauge interface 12 is arranged between the oil mist pressure regulating valve 11 and the oil mist generator 15, and the oil mist pressure gauge 17 is connected outside the interface; the air pressure gauge interface 14 is arranged between the air pressure regulating valve 13 and the air separator 16, and the compressed air pressure gauge 19 is connected outside the interface. The oil tank 8 is arranged at the upper part of the device, the oil filling port 9 is arranged at the top of the oil tank 8, the oil drain valve 7 is arranged at the bottom of the rear side, the oil quantity regulating valve 10 is arranged between the oil tank 8 and the oil mist generator 15 to regulate the oil supplied to the oil mist generator 15, and the oil mist generator 15 is provided with the safety valve 6. The oil mist generator 15 mixes compressed air with lubricating oil and then outputs high-pressure oil mist, and the output end thereof is provided with six interfaces from top to bottom, which are respectively A1, A2, A3, A4, A5 and A6; the air separator outputs the compressed air after temporary storage and equalization, and the output end thereof is provided with five interfaces from top to bottom, which are respectively B1, B2, B3, B4 and B5.

The connection method of the wheel machining lubrication device is: the oil mist output interfaces A1, A2, A3, A4, A5, A6 are respectively connected to an outer rim cutter, an inner rim cutter, a central hole flange cutter, a spoke back cavity cutter, a front machining cutter and a drilling cutter during wheel machining, all of which are internally cooled structural cutters with internal small holes and can deliver oil mist to the tip. The compressed air output ports B1, B2, B3, B4, B5 are respectively connected to five positions on a machine tool, which are right above, front, rear, left and right of a wheel, in order to timely take away aluminum scraps left in all directions during machining, thereby preventing blockage, interference to the lubrication of the tip and scratch of aluminum scraps to the surface of the wheel.

The oil mist output pressure can be regulated via the oil mist pressure regulating knob 18, the compressed air output pressure can be regulated via the air pressure regulating knob 20, the oil mist output by the device is used for cooling and lubrication of cut portions during machining, the output compressed air is used for taking away the aluminum scraps on the wheel, and the two are indispensable and complete the lubrication during the aluminum wheel machining jointly. If only oil mist is provided while no compressed air is provided, the aluminum scraps are accumulated, the cutter tips cannot be lubricated well, the service lives of the cutters are shortened, the surface of the wheel is scratched, etc.

The device can meet the requirements of a lubrication process when a wheel is machined, can completely replace the traditional cutting fluid lubrication method, greatly reduce the manufacturing cost and improve the manufacturing environment, and has the advantages of simple structure, easy manufacture, convenient operation and the like.

Figure 1:
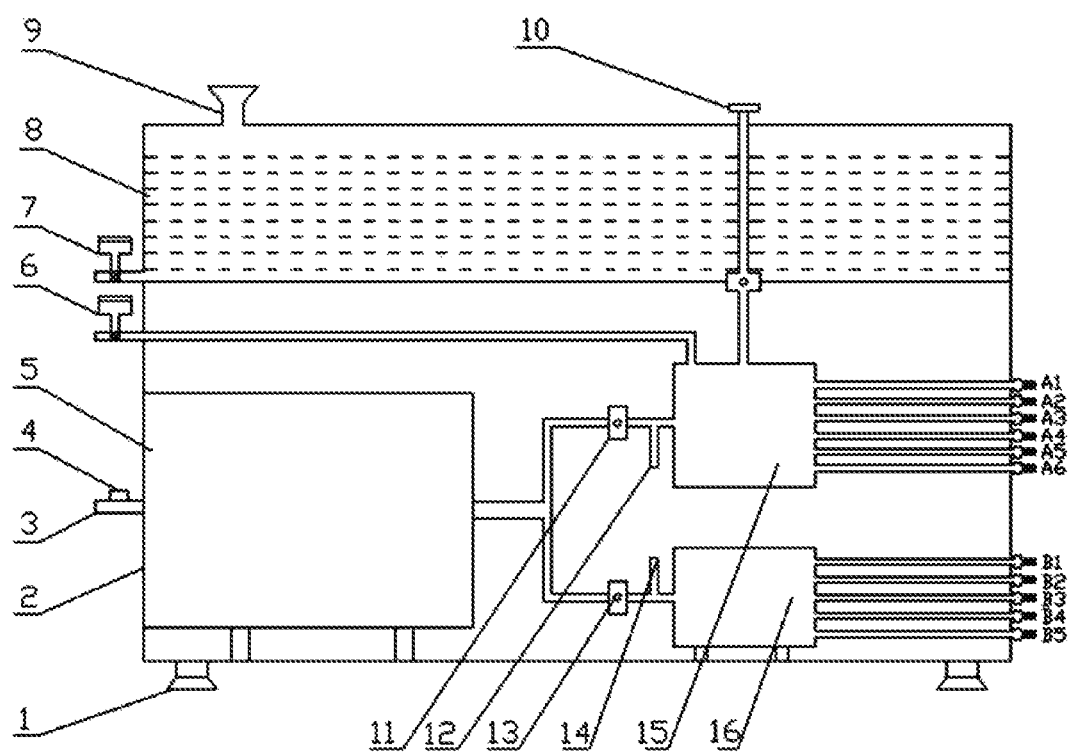
FIG. 1 is a view showing an internal structure of a wheel machining lubrication device according to the present disclosure.
Figure 2:
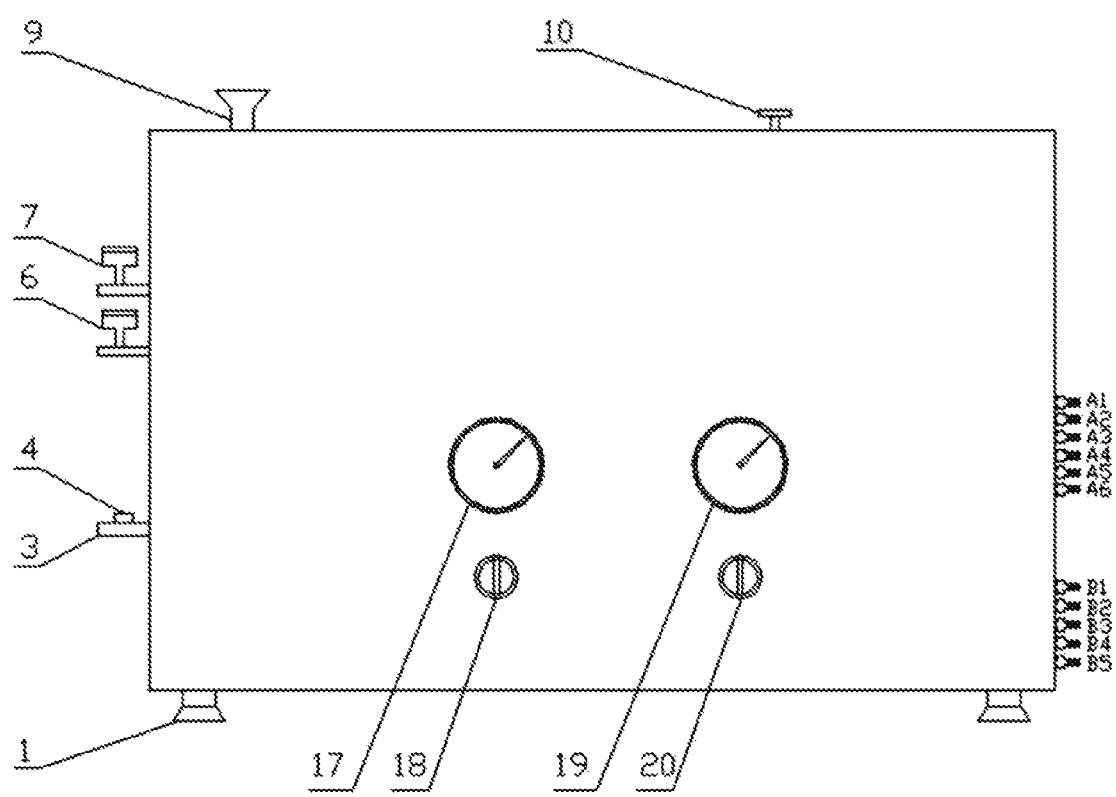
FIG. 2 is a front view of the wheel machining lubrication device according to the present disclosure.

In which, 1-adjustable feet, 2-frame, 3-power interface, 4-power switch, 5-air compressor, 6-safety valve, 7-oil drain valve, 8-oil tank, 9-oil filling port, 10-oil quantity regulating valve, 11-oil mist pressure regulating valve, 12-oil mist pressure gauge interface, 13-air pressure regulating valve, 14-air pressure gauge interface, 15-oil mist generator, 16-air separator, 17-oil mist pressure gauge, 18-oil mist pressure regulating knob, 19-compressed air pressure gauge, 20-air pressure regulating knob, A1-A6—oil mist output interfaces, B1-B5—compressed air output interfaces.

DETAILED DESCRIPTION

The details and working conditions of the specific device proposed by the present disclosure will be described below in combination with the accompanying drawings.

A wheel machining lubrication device is composed of adjustable feet, a frame, a power interface, a power switch, an air compressor, a safety valve, an oil drain valve, an oil tank, an oil filling port, an oil quantity regulating valve, an oil mist pressure regulating valve, an oil mist pressure gauge interface, an air pressure regulating valve, an air pressure gauge interface, an oil mist generator, an air separator, an oil mist pressure gauge, an oil mist pressure regulating knob, a compressed air pressure gauge, an air pressure regulating knob, oil mist output interfaces A1-A6 and compressed air output interfaces B1-B5. The air compressor is fixed on the frame, the output end thereof is divided into two paths, one path is connected to the oil mist pressure regulating valve, and the oil mist pressure regulating knob is connected outside the regulating valve; the other path is connected to the air pressure regulating valve, and the air pressure regulating knob is connected outside the regulating valve; the oil mist pressure gauge interface is arranged between the oil mist pressure regulating valve and the oil mist generator, and the oil mist pressure gauge is connected outside the interface; the air pressure gauge interface is arranged between the air pressure regulating valve and the air separator, and the compressed air pressure gauge is connected outside the interface. The oil tank is arranged at the upper part of the device, the oil filling port is arranged at the top of the oil tank, the oil drain valve is arranged at the bottom of the rear side, the oil quantity regulating valve is arranged between the oil tank and the oil mist generator to regulate the oil supplied to the oil mist generator, and the oil mist generator is provided with the safety valve. The oil mist generator mixes compressed air with lubricating oil and then outputs high-pressure oil mist, and the output end thereof is provided with six interfaces from top to bottom, which are respectively A1, A2, A3, A4, A5 and A6; the air separator outputs the compressed air after temporary storage and equalization, and the output end thereof is provided with five interfaces from top to bottom, which are respectively B1, B2, B3, B4 and B5.

The connection method of the wheel machining lubrication device is: the oil mist output interfaces A1, A2, A3, A4, A5, A6 are respectively connected to an outer rim cutter, an inner rim cutter, a central hole flange cutter, a spoke back cavity cutter, a front machining cutter and a drilling cutter during wheel machining, all of which are internally cooled structural cutters with internal small holes and can deliver oil mist to the tip. The compressed air output ports B1, B2, B3, B4, B5 are respectively connected to five positions on a machine tool, which are right above, front, rear, left and right of a wheel, in order to timely take away aluminum scraps left in all directions during machining, thereby preventing blockage, interference to the lubrication of the tip and scratch of aluminum scraps to the surface of the wheel.

The oil mist output pressure can be regulated via the oil mist pressure regulating knob 18, the compressed air output pressure can be regulated via the air pressure regulating knob 20, the oil mist output by the device is used for cooling and lubrication of cut portions during machining, the output compressed air is used for taking away the aluminum scraps on the wheel, and the two are indispensable and complete the lubrication during the aluminum wheel machining jointly. If only oil mist is provided while no compressed air is provided, the aluminum scraps are accumulated, the cutter tips cannot be lubricated well, the service lives of the cutters are shortened, the surface of the wheel is scratched, etc.

The device can meet the requirements of a lubrication process when a wheel is machined, can completely replace the traditional cutting fluid lubrication method, greatly reduce the manufacturing cost and improve the manufacturing environment, and has the advantages of simple structure, easy manufacture, convenient operation and the like.

The invention claimed is:

1. A wheel machining lubrication device, comprising adjustable feet, a frame, a power interface, a power switch, an air compressor, a safety valve, an oil drain valve, an oil tank, an oil filling port, an oil quantity regulating valve, an oil mist pressure regulating valve, an oil mist pressure gauge interface, an air pressure regulating valve, an air pressure gauge interface, an oil mist generator, an air separator, an oil mist pressure gauge, an oil mist pressure regulating knob, a compressed air pressure gauge, an air pressure regulating knob, six oil mist output interfaces and five compressed air output interfaces, wherein: the air compressor is fixed on the frame, an output end of the air compressor is divided into two paths, one path of the two paths is connected to the oil mist pressure regulating valve, and the oil mist pressure regulating knob is connected outside the oil mist pressure regulating valve; a second path of the two paths is connected to the air pressure regulating valve, and the air pressure regulating knob is connected outside the air pressure regulating valve; the oil mist pressure gauge interface is arranged between the oil mist pressure regulating valve and the oil mist generator, and the oil mist pressure gauge is connected outside the oil mist pressure gauge interface; the air pressure gauge interface is arranged between the air pressure regulating valve and the air separator, and the compressed air pressure gauge is connected outside the air pressure gauge interface, the oil tank is arranged at an upper part of the wheel machining lubrication device, the oil filling port is arranged at a top of the oil tank, the oil drain valve is arranged, on one side of the oil tank, at a bottom of the oil tank, the oil quantity regulating valve is arranged between the oil tank and the oil mist generator to regulate oil supplied to the oil mist generator, and the oil mist generator is provided with the safety valve, the oil mist generator mixes compressed air with lubricating oil and then outputs high-pressure oil mist, and an output end of the oil mist generator is provided with the six oil mist output interfaces arranged successively along a direction from a top of the wheel machining lubrication device to a bottom of the wheel machining lubrication device; the air separator outputs the compressed air after temporary storage and equalization, and an output end of the air separator is provided with the five compressed air output interfaces arranged successively along the direction from the top of the wheel machining lubrication device to the bottom of the wheel machining lubrication device.

2. A wheel machining lubrication device according to claim 1, wherein the six oil mist output interfaces are respectively connected to an outer rim cutter, an inner rim cutter, a central hole flange cutter, a spoke back cavity cutter, a front machining cutter and a drilling cutter during wheel machining, all of which are internally cooled structural cutters with internal small holes and configured to deliver oil mist to a tip of each of the internally cooled structural cutters, the five compressed air output interfaces respectively connected to five positions on a machine tool, which are right above, front, rear, left and right of a wheel, in order to take away aluminum scraps left in all directions during machining, thereby preventing blockage, interference to lubrication of the tip and scratching of aluminum scraps to a surface of the wheel.

* * * * *